United States Patent
Basler

[11] Patent Number: 6,131,284
[45] Date of Patent: Oct. 17, 2000

[54] METHOD OF MANUFACTURING A MOTOR VEHICLE

[76] Inventor: Norbert Basler, Kornstrasse 29A, D-38154 Koenigslutter, Germany

[21] Appl. No.: 08/809,420

[22] PCT Filed: Oct. 24, 1995

[86] PCT No.: PCT/DE95/01494

§ 371 Date: Apr. 25, 1997

§ 102(e) Date: Apr. 25, 1997

[87] PCT Pub. No.: WO96/13421

PCT Pub. Date: May 9, 1996

[30] Foreign Application Priority Data

Oct. 26, 1994 [DE] Germany .............................. 44 38 214

[51] Int. Cl.$^7$ ................................................... B21D 53/88
[52] U.S. Cl. ............................................ 29/897.2; 29/458
[58] Field of Search ......................... 29/458, 460, 897.2, 29/525.02; 296/197, 194, 195, 196, 29, 185; 280/785

[56] References Cited

U.S. PATENT DOCUMENTS

| | | | |
|---|---|---|---|
| 4,099,313 | 7/1978 | Phillips | 296/185 |
| 4,590,654 | 5/1986 | Kajiura | 29/458 |
| 4,995,545 | 2/1991 | Wycech | 29/458 |
| 5,090,105 | 2/1992 | Degrees | 29/460 |
| 5,092,649 | 3/1992 | Wurl | 296/185 |
| 5,288,356 | 2/1994 | Benefiel | 29/458 |
| 5,301,997 | 4/1994 | Cudden | 296/197 |
| 5,319,840 | 6/1994 | Yamamoto et al. | 29/458 |
| 5,325,585 | 7/1994 | Sasaki et al. | 29/897.2 |
| 5,428,880 | 7/1995 | Tomioka et al. | 29/458 |
| 5,787,585 | 8/1998 | Rashid | 29/897.2 |

FOREIGN PATENT DOCUMENTS

| | | | |
|---|---|---|---|
| 0349306 | 1/1990 | European Pat. Off. | 29/897.2 |
| 37 22 869 | 1/1989 | Germany . | |
| 62-157873 | 7/1987 | Japan | 29/458 |
| 63-87386 | 4/1988 | Japan | 29/458 |
| 4-292274 | 10/1992 | Japan | 29/897.2 |
| 4-310485 | 11/1992 | Japan | 29/897.2 |
| 5-124548 | 5/1993 | Japan | 29/897.2 |
| 5-162671 | 6/1993 | Japan | 29/897.2 |
| 6-8851 | 1/1994 | Japan . | |
| 92/07749 | 5/1992 | WIPO . | |

*Primary Examiner*—Irene Cuda
*Assistant Examiner*—Trinh Nguyen
*Attorney, Agent, or Firm*—Foley & Lardner

[57] ABSTRACT

A motor vehicle is produced by joining two semifinished, preassembled bodies, a front structure and a rear structure. Each of these structures are preassembled with associated automobile components. That is, the front structure is assembled with engine, transmission (for a front engine mounted car), and related components, instrument panel, steering wheel, etc. The front structure is also semifinished in a standard color. The rear structure has preassembled decorative components, such as seats, carpeting, covering, etc. The rear structure has the final finish (in the desired final color). The windshield frame can be part of either the front or the rear structure. The roof is part of the rear structure. The front and the rear structure are joined together near the middle of the vehicle body. Existing assembly tools can be used to join the front and rear structures. After the front and rear structures are joined, the front structure is finished with the final color, matching that of the rear structure. Thereafter, additional components, which are finished with the final color, such as a mudguard, an engine hood or bonnet, doors, and other outer covering, namely a bumper, and a radiator grille, are connected to the joined structures.

15 Claims, 4 Drawing Sheets

METHOD OF MANUFACTURING A MOTOR VEHICLE

BACKGROUND

The invention relates to a method of manufacturing a motor vehicle. In principle, in extreme cases, motor vehicles can be made up completely of individual parts or put together from prefabricated parts. The conventional modern method of manufacturing motor vehicles is a mixed system.

Components and sub-assemblies prefabricated to a varying extent are inserted into opened, painted bodies. The disadvantage of this is that sensitive painted bodies may be damaged by the wide variety of far-reaching assembly work. Damage to the outer skin during assembly will involve expensive after-treatment post final assembly.. The supply and assembly of large parts is complicated and, since it is often difficult to automate, has to be manually performed under adverse physiological conditions. Assembly of smaller parts increases the number of assembly operations on site, increasing the number of operators. These operators can get in one another's way and lengthen the assembly time. Standardization and model flexibility are difficult to combine.

As is known, economic advantages can be obtained if the minimum number of pre-fitted sub-assemblies are used in the manufacture of complex engineering products. Recent manufacturing concepts, therefore, are based on prefabricating a vehicle in individual modules of maximum size. The individual modules can be completed separately. After being manufactured, optionally at different workplaces, they are brought on the conveyor belt for final assembly of the vehicle.

The manual by Horst Pippert "Karosserietechnik", 2nd edition, Würzburg: Vogel Buchverlag 1993, discloses various modular construction methods for rationalizing the assembly of motor vehicles.

In the sub-frame method of construction, the sub-frames receive both the chassis and the drive. They are pre-assembled with these units and screwed to the self-supporting body via Silentblock-type rubber-metal connections.

It is also known, for example, to insert the entire dashboard, including the cockpit and pedals in one module, into the front part of the semifinished body and stick or screw it to the floor group.

In another embodiment the floor element has a module with ready-mounted cockpit, pedal supports and seats, can be inserted from beneath and stuck in the body bearing structure.

It is also known to separate the front region from the roof and the floor group. By means of this horizontal division of the vehicle, the floor group can easily be equipped and, more especially, the drive block can easily be fitted before final assembly.

A division into front and rear parts results in a vertically divided body. In this case, a closed, rigid passenger compartment in the middle of the vehicle is connected to separately-prepared front and rear parts in steel frame construction.

All the different methods are based on the problem of prefabricating maximum-sized units. To a varying extent, however, they all have the disadvantage that in they mostly optimize only one requirement, e.g. ease of assembly, but require compensating far-reaching structural changes or design changes.

Frequently it is necessary to abandon the economic method of constructing the self-supporting body from pressed parts, or new materials have to be used without a convincing amount of advantage.

WO 92/07749 discloses a method of assembling a motor vehicle, where a front structure after completion is connected to a completed rear structure. The dividing line of the body extends centrally via the roof region. A disadvantage of the known method is that, owing to the required stability, it is very complicated to connect the two main parts of the body. In the case of a self-supporting body the roof region is load-bearing. If the front structure is joined to the rear structure centrally in the roof region, the very thin sheet metal cannot bear loads, and consequently the floor group, which is similarly divided, has to be suitably reinforced. Such reinforcement considerably increases the weight.

JP-A-6-8851 discloses a concept where the body is not equatorially divided, but the vehicle comprises a number of components. The floor group like the body, which is mounted on the floor group, comprises two parts. The method disclosed in the citation emphasizes the importance of the skeleton and is very close to the frame construction of cars in earlier periods. It shows the need for strong profile and auxiliary frames.

SUMMARY

Starting from these problems, the aim of the invention is to disclose a method of manufacturing a motor vehicle suitable for economic segment construction and wherein the individual segments can be constructed substantially with conventional materials, tools, and methods.

To this end, the semifinished body is pre-assembled in two main body parts (front structure and rear structure), the main body parts (front structure and rear structure) are independently equipped with the associated components, the mainly engineering components (motor, transmission, subsidiary equipment and the like) are mainly mounted in one main body part (front structure) and the mainly decorative components (seats, coverings, carpet and the like) are mainly installed in the other main body part (rear structure), and after the main body parts (front and rear structure) have been at least substantially completed, they are put together and rigidly joined.

This way prefabrication can be made from only two main parts or main groups. Existing manufacturing equipment and assembly methods can largely be retained when manufacturing and completing the front and rear structure. The traditional materials can continue to be used and no design changes are necessary. The front structure and the rear structure can be assembled at different places. At the final stage, they are simply brought together at the same place and riveted, stuck, screwed, or welded together. The body is self-supporting as before.

The cost of having various models on offer is considerably reduced, because usually the engineering variants are basically restricted to different motorization whereas there are much wider variations in the decoration, interior and other accessories. Further flexibility is obtained since there is wide freedom to combine the individual variants up to the final stage.

Especially advantageously, the mudguard, the bonnet, the doors and other external covering parts such as the bumper, radiator grille and the like are secured to the front structure only after the main body parts have been joined together. By this means, all the sensitive-surface parts are absent when the front part is assembled. They therefore cannot be damaged during assembly of the drive and transmission block with the main auxiliary groups and when the cockpit and pedals are incorporated in the front part.

Also, in all model variants, the front part can be coated with a uniform paint, which is covered and therefore made invisible after the outer skin parts have been assembled. In view of the streamlining requirements on a modern motor vehicle, this modification has a further advantage because the bonnet must substantially cover the lower frame of the windscreen, e.g., so as to recess and streamline the windscreen wiper, and the A-column is covered by the windscreen or door frame, which is flush when stuck in. This provides hitherto unknown advantages in the choice of production sites, market flexibility, logistics and repairs.

To this end also it is advantageous if the components for subsequently securing to the front structure and painting in the color of the vehicle can be painted together with the rear structure, simultaneously if necessary. This ensures that no differences in colour shade are observable in the finished vehicle.

In principle, the main body parts can be joined at the level of the A-column, the connecting-places being provided on the windscreen frame and on the floor group approximately at the level of the top end of the A- column. The frame for the windscreen can be disposed either on the front structure, so that the A-column becomes part of the front structure, or on the rear structure, so that it becomes part of the rear structure. The advantage of disposing the windscreen frame on the front structure is that the rear structure has a larger opening for fitting the interior.

When the main body parts are separated underneath the windscreen there is greater freedom to design the body segment. For example, a limousine or a coupéversion can both be equipped with the same front structure.

In another embodiment the front structure can comprise the entire floor group, i.e., the car floor and the running gear, by which means the advantages of the invention can also be applied to standard-drive vehicles (front or rear drive).

The invention can be used to obtain new forms of standardisation, thus improving the logistics of manufacture, use, disposal, repair and recycling. The combination of the individual advantages has an additional, decisive synergistic effect compared with traditional methods. Left-hand and right-hand steering versions of vehicles can easily be constructed.

Owing to the wide opening near the middle of the hollow body member, parts can be supplied and fitted easily and simultaneously in both segments (main body parts) before final assembly.

BRIEF DESCRIPTION OF THE DRAWINGS

Examples of the invention will now be explained in detail with reference to the drawings, in which.

Figure 1:
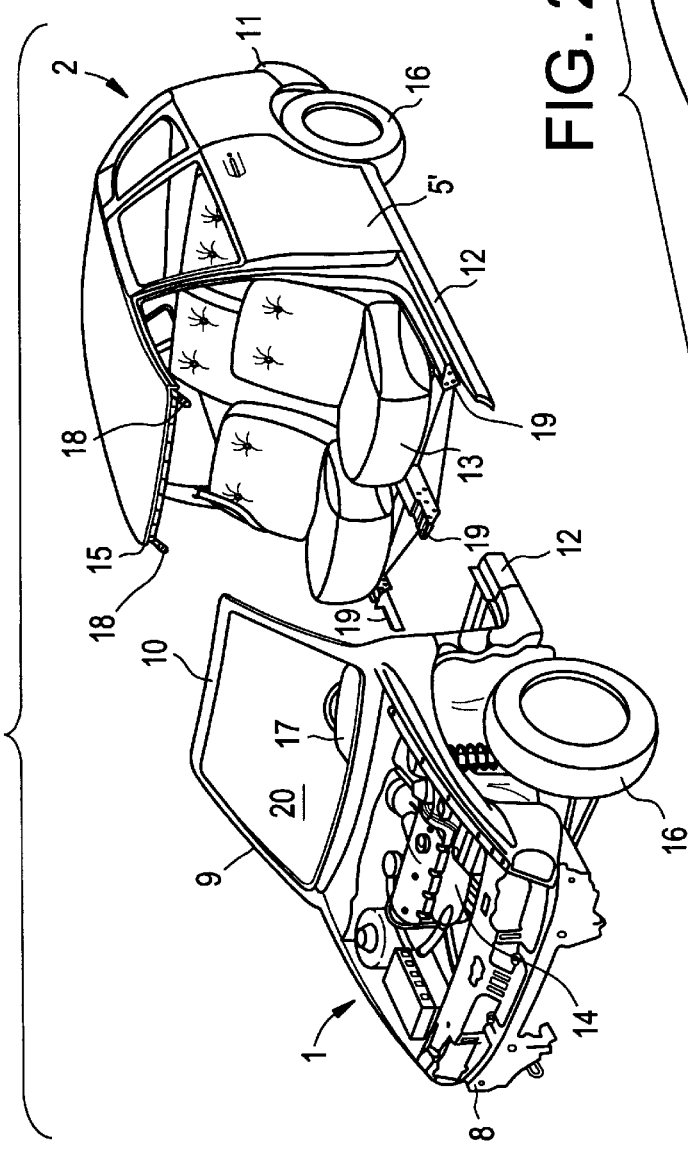
FIG. 1 is a perspective view of the front and rear parts.
Figure 2:
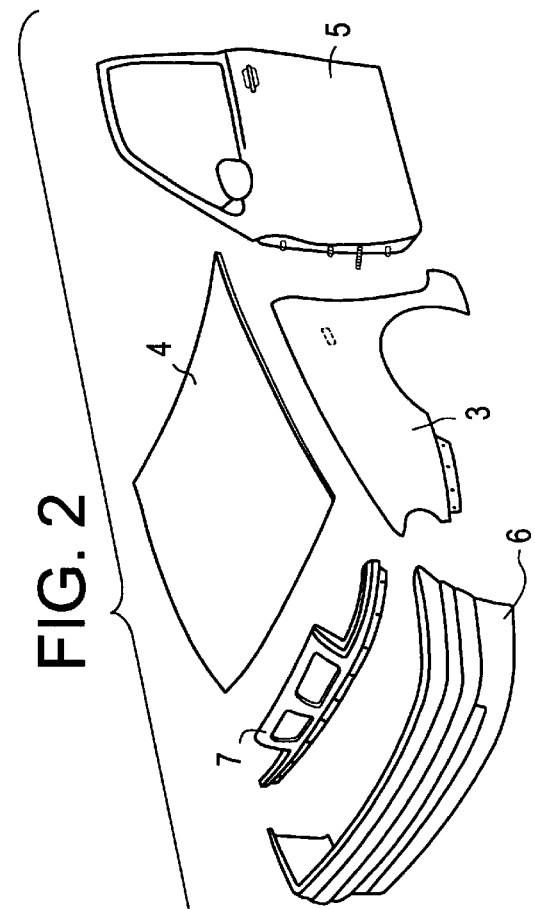
FIG. 2 shows the outer covering parts for the front part.
Figure 3:
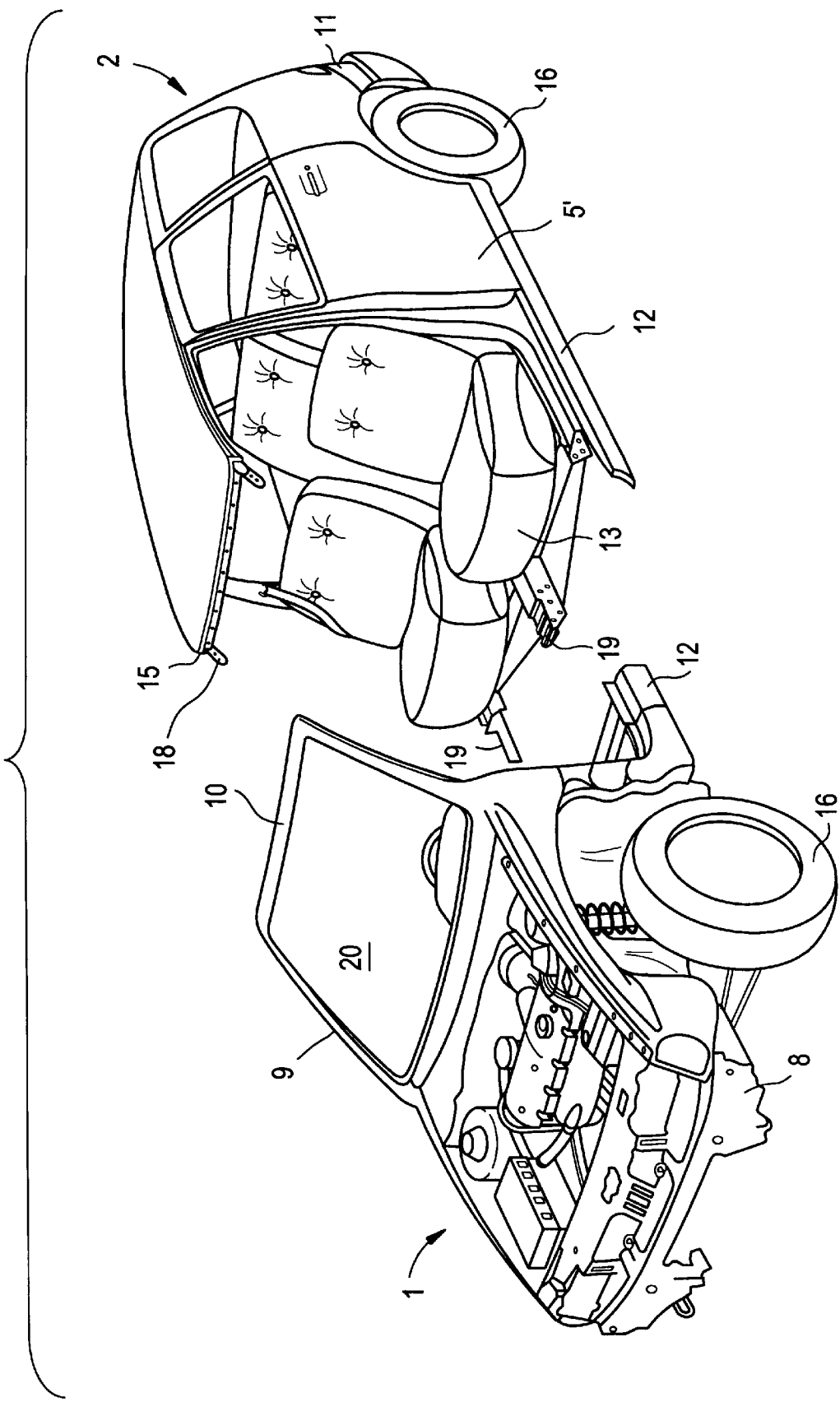
FIG. 3 corresponds to FIG. 1, with a modified rear part.

According to the invention, the semifinished body is pre-assembled from two main body parts, a front structure 1 and a rear structure 2. The sub-assemblies, which mainly determine the engineering properties of the vehicle, are disposed in the front part 1. These sub- assemblies are, e.g. the engine 14, the transmission (not shown) and subsidiary units (also not shown) such as the air-conditioning system, the dynamo, radiator, etc. The front part also contains the cockpit 17 with the control components e.g., instrument panel, (not shown).

The front part 1 is bounded by the body nose 8, i.e., the front end of the vehicle, and the A-column 9, which is closed by the frame 10 for the windshield 20. The floor group 12 belonging to the front part 1 ends approximately opposite the top end of the A-column 9 (vertically below it). The front part 1 is a structure that determines the strength and collision behavior of the vehicle and on delivery is painted in a uniform color, not the colour of the final vehicle, before the units are incorporated in the front part 1. The large opening in the middle of the semifinished body enables the cockpit 17 to be easily installed beforehand and facilitates insertion of the engine 14 and auxiliary units into the engine space from above and fitting of the axle, or the complete drive in the case of a front-engined vehicle, from beneath. After the front part 1 has been fitted with the required components, it and the rear part 2 are transported to the assembly site provided for the final stage.

The rear structure 2 is bounded by the body tail 11 and the roof attachment to the A-column 9. As FIG. 1 shows, the rear structure 2 can be fitted beforehand with the interior, the seats 13, the roof canopy (not shown), the side coverings, the safety-belts (not shown) and the floor carpet. After all the decorative parts have, been fitted in the rear structure 2, it can be completed with the rear doors 5), the boot lid or the rear flap and then brought to the front part 1 for the final stage.

The front part 1 and rear part 2 are rigidly connected by suitable means. The drawings show simplified fastening places 18 on the roof and 19 on the floor group 12. The connection can be made by riveting, screwing, welding or sticking. Suitable methods are familiar to a person of ordinary skill in the art.

After the front part 1 and rear part 2 have been fitted together, in the final stage, the standard-painted front structure 1, now the front part of the vehicle, is connected to the attached parts, i.e., the mudguard 3, the bonnet 4, the front doors 5, the bumper 6 and the radiator grille 7, which form the finish and are painted in parallel with the rear structure and are delivered in the same color as the vehicle. The connection as before can be by riveting, screwing or sticking. Parts of the vehicle not covered by attached parts and still visible in the uniform basic paint, particularly inside the vehicle, can be concealed by soft cover parts.

Either the wheels 16 are fitted last on to the finished vehicle or they are attached during assembly of the two main body parts. Of course the vehicle must be completed by other components such as fuel and brake lines and electric connections and the like.

Figure 4:
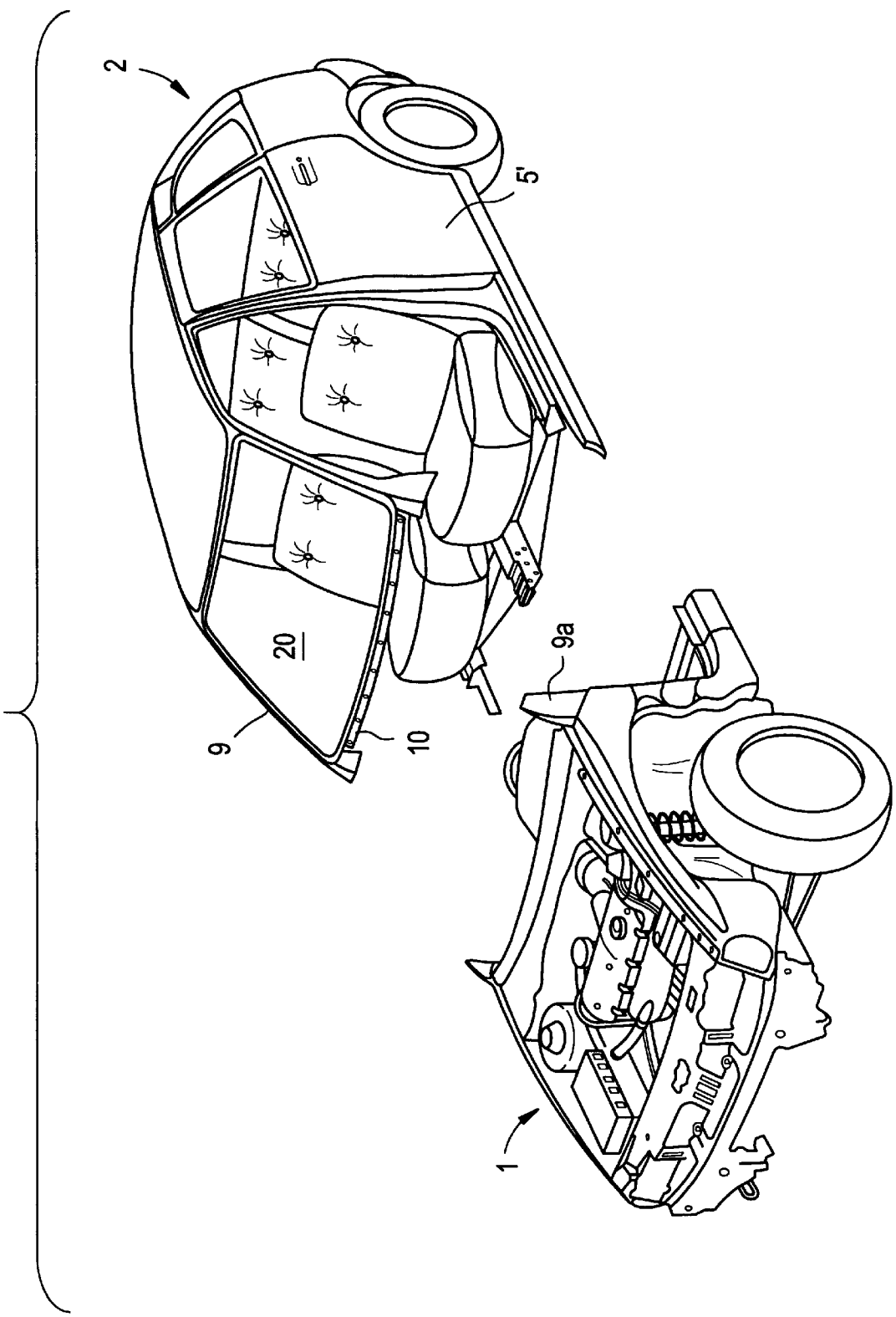
FIG. 4 is a perspective view of another embodiment of the invention.

FIG. 4 shows a modification of the front structure 1 and rear structure 2. The frame 10 of the windshield 20 and consequently the A-column 9 is associated with the rear structure 2. The front structure 1 therefore ends at the bottom end 9a of the A-column 9. The front structure 1 and rear structure 2 are subsequently connected via the aforementioned end 9a and the A-column 9. This embodiment has the advantage in the variability of the body is increased without affecting the front structure 1.

In another embodiment (not shown) the floor group 12 can be associated completely with the front structure 1. If, however, the rear structure 2 needs to be provided with a floor plate and the floor group 12 forms only one running-gear frame, the advantages of the invention can also be obtained in the case of vehicles with a front engine and rear drive.

Figure 5:
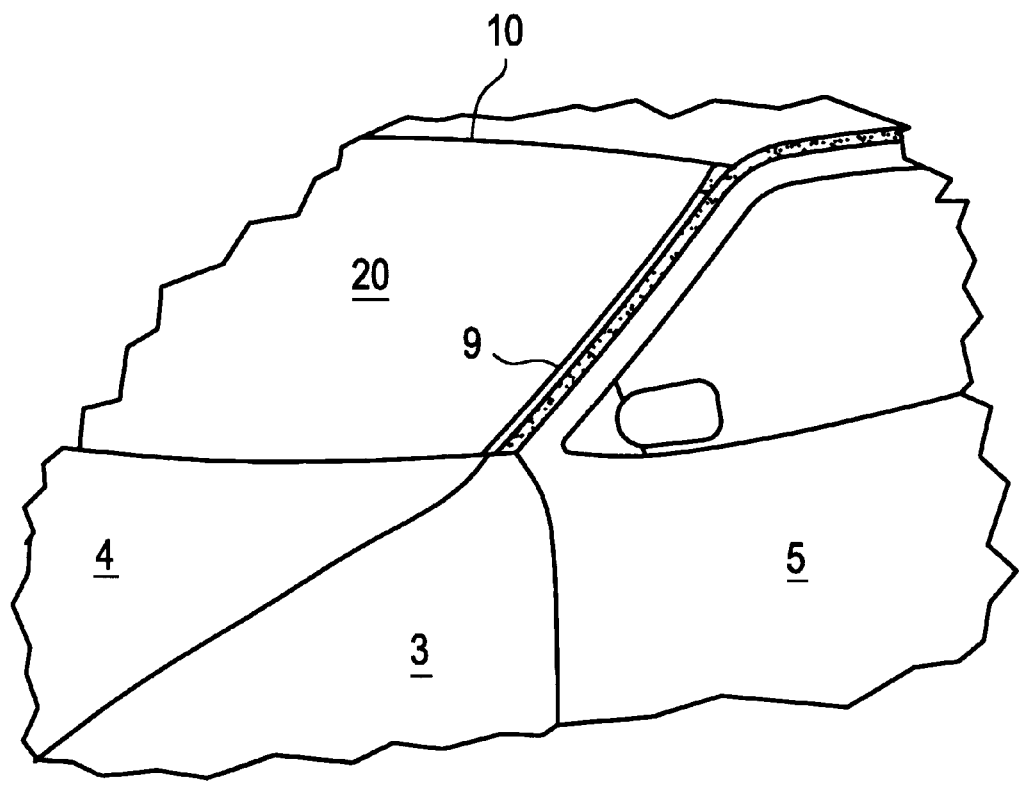
FIG. 5 shows part of the A-column of a streamlined modern vehicle, including the adjacent components.

As FIG. 5 shows, in streamlined vehicles the A-column 9 is completely covered by the frame of the front door 5 and the windscreen 20, which is flush with the frame. The bonnet 4, which extends far beyond the bottom end of the windshield 20, covers the bottom-region of the window-frame.

What is claimed is:

1. A method of manufacturing a vehicle, comprising:
   forming a vehicle front structure with a flooring, and with a semifinished standard color;
   forming a vehicle rear structure with a flooring and a roof, and with a final finished color;
   forming a windshield frame integrated with one of the vehicle front and rear structures;
   assembling the front structure with associated main components, including a steering assembly and an instrument panel;
   assembling the rear structure with associated carpeting, seats, and interior covering;
   fixedly joining the front and rear structures at the windshield frame and at the floorings of the front and rear structures;
   after joining the front and rear structures finishing only the front structure to match the final finished color of the rear structure;
   assembling external components, finished with the final color matching that of the front and rear structures, to the joined front and rear structures.

2. A method according to claim 1, wherein the associated main components includes an engine and a transmission, and the external components include a mudguard, a front bumper, an engine hood, a radiator grille, and doors.

3. A method according to claim 1, wherein the windshield frame is integral with the front structure, and the roof of the rear structure is directly connected to the windshield frame.

4. A method according to claim 3, wherein the flooring of the front structure ends vertically below the top of the windshield frame.

5. A method according to claim 4, wherein the windshield frame has A-column sweeping upwardly and rearwardly on each side from the front structure.

6. A method according to claim 5, wherein the roof of the rear structure is fastened to upper ends of the A-columns.

7. A method according to claim 1, wherein the windshield frame is integral with the rear structure, and the lower end of the windshield frame is connected to the front structure.

8. A method according to claim 7, wherein the flooring of the front structure ends vertically below the top of the windshield frame.

9. A method according to claim 8, wherein the windshield frame has A-column sweeping downwardly and forwardly on each side from the rear structure.

10. A method according to claim 8, wherein the front structure has a member on each upper side thereof to receive one of the A-columns, the lower end of the A-column being joined to the A-column receiving member.

11. A method according to claim 1, wherein the front structure is connected to the rear structure by rivets, screws, welding, or sticking.

12. A method of manufacturing a vehicle, comprising:
    forming a vehicle front structure with a windshield frame and a flooring;
    forming a vehicle rear structure with a flooring and a roof;
    assembling the front structure with associated main components, including a steering assembly and an instrument panel;
    assembling the rear structure with associated carpeting, seats, and interior covering;
    fixedly joining the windshield frame of the front structure directly to the roof of the rear structure, and fixedly joining the floorings of the front and rear structures.

13. A method according to claim 12, wherein the associated main components include an engine and a transmission.

14. A method according to claim 12, wherein the flooring of the front structure ends vertically below the top of the windshield frame.

15. A method according to claim 14, wherein the windshield frame has A-column sweeping upwardly and rearwardly on each side from the front structure.

* * * * *